No. 838,240. PATENTED DEC. 11, 1906.
D. F. CHURCHILL.
CORN HARVESTING AND HUSKING MACHINE.
APPLICATION FILED APR. 5, 1906.
4 SHEETS—SHEET 1.
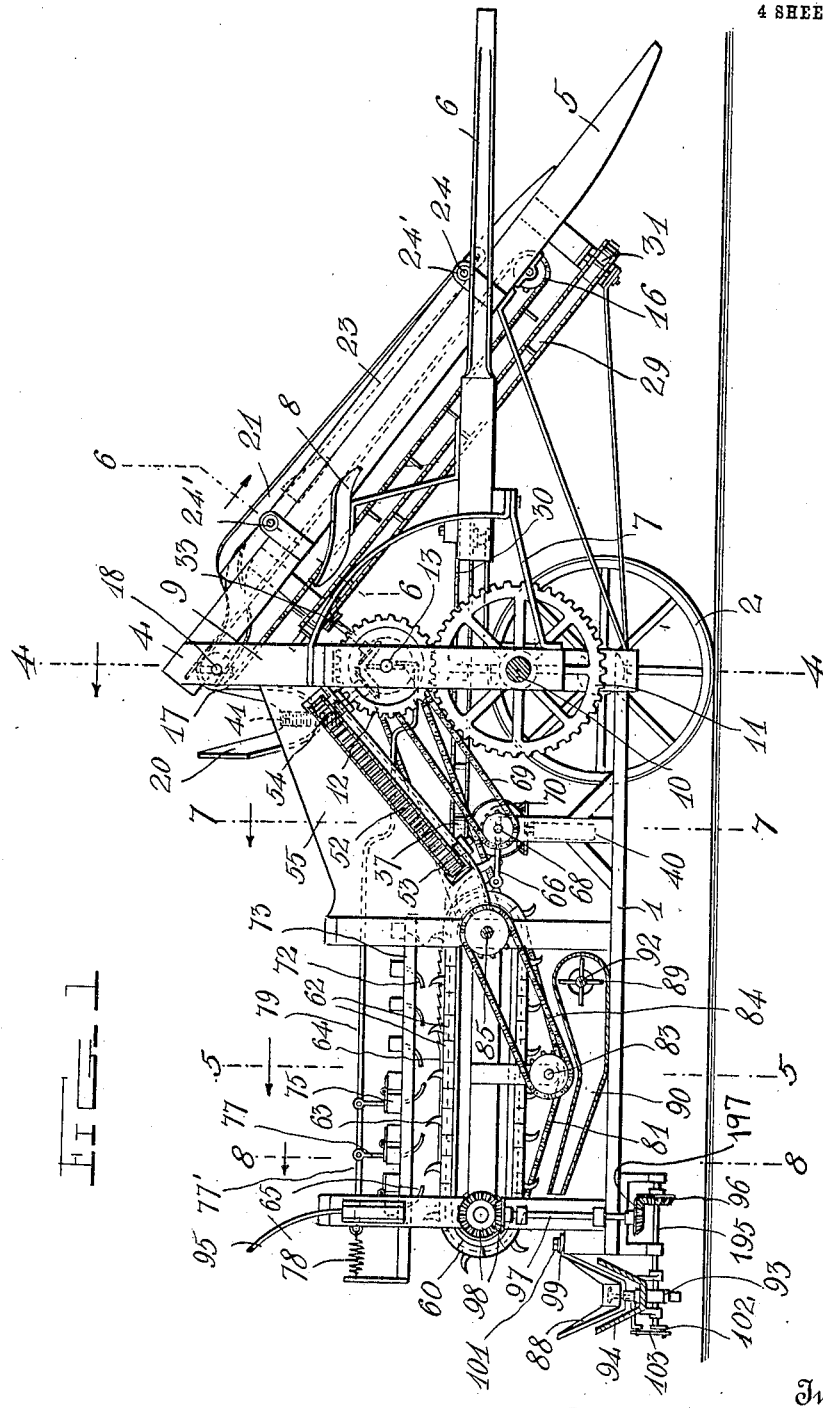
Witnesses
Inventor
D. F. Churchill
by
Attorneys No. 838,240. PATENTED DEC. 11, 1906.
D. F. CHURCHILL.
CORN HARVESTING AND HUSKING MACHINE.
APPLICATION FILED APR. 5, 1906.
4 SHEETS—SHEET 2.
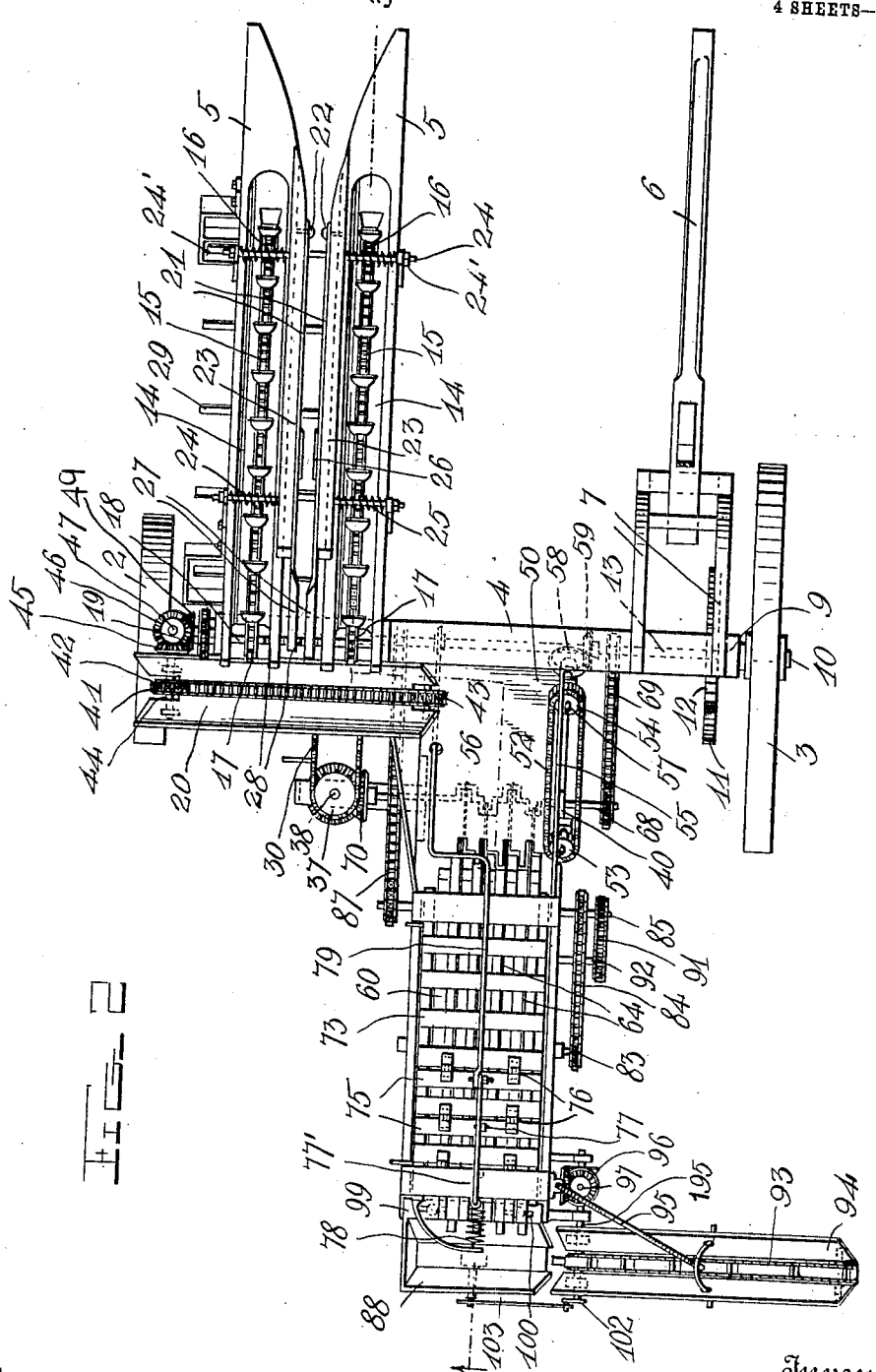
Witnesses
Inventor
D. F. Churchill
by
Attorneys

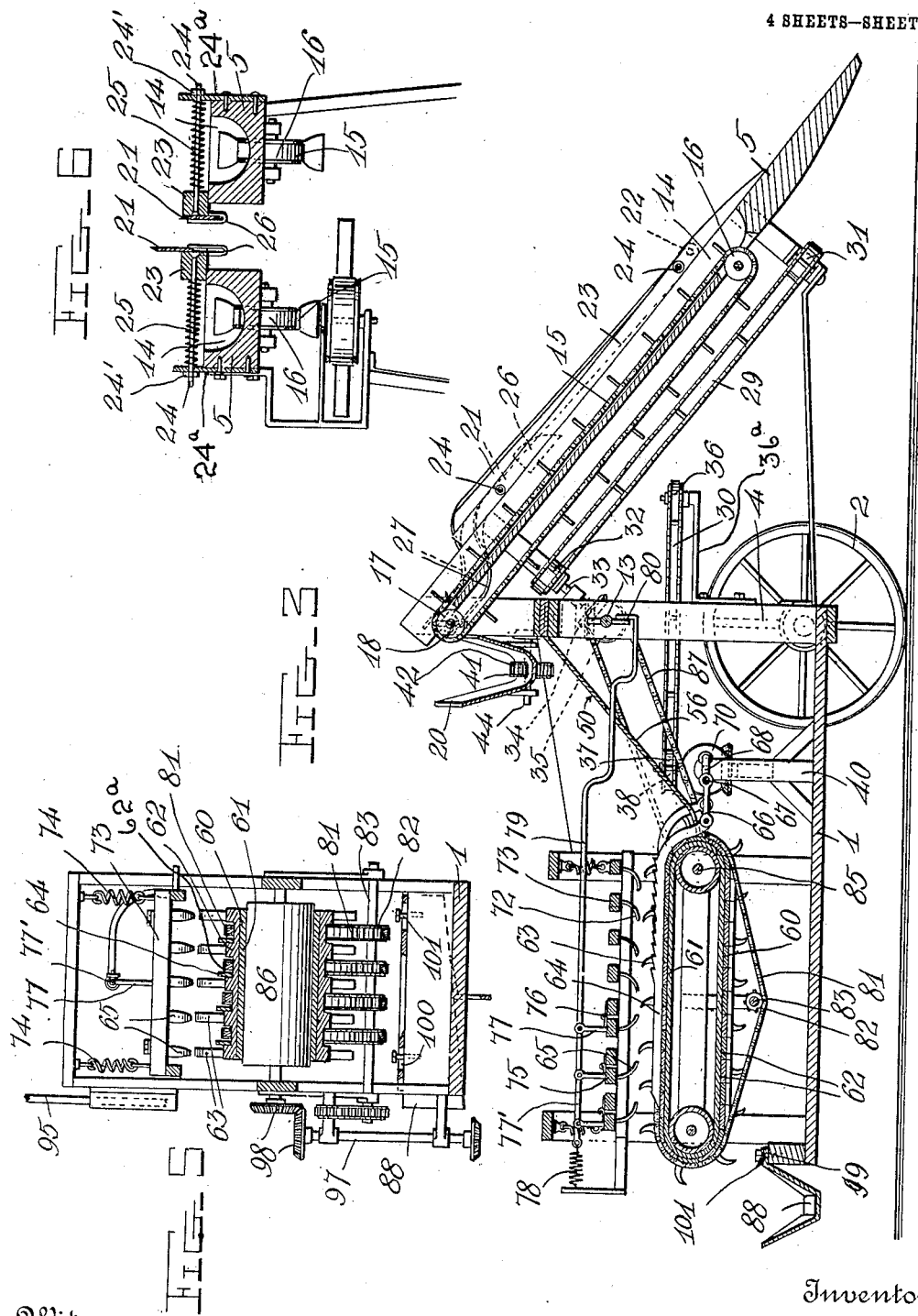

No. 838,240. PATENTED DEC. 11, 1906.
D. F. CHURCHILL.
CORN HARVESTING AND HUSKING MACHINE.
APPLICATION FILED APR. 5, 1906.
4 SHEETS—SHEET 4.
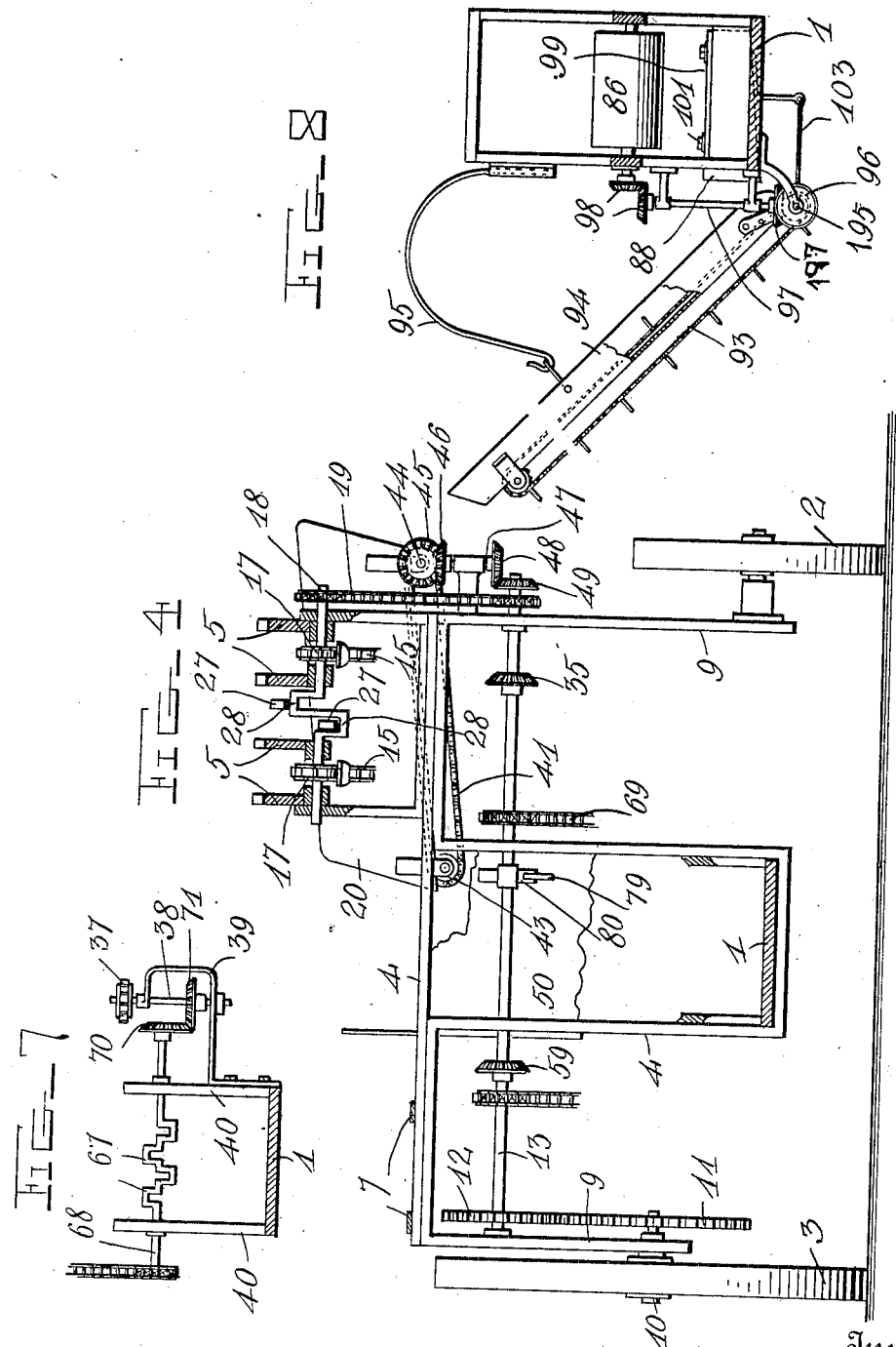
Witnesses
Inventor
D. F. Churchill
by H. B. Willson & Co.
Attorneys

UNITED STATES PATENT OFFICE.

DANIEL F. CHURCHILL, OF WAKONDA, SOUTH DAKOTA.

CORN HARVESTING AND HUSKING MACHINE.

No. 838,240.
Specification of Letters Patent.
Patented Dec. 11, 1906.

Application filed April 5, 1906. Serial No. 310,088.

*To all whom it may concern:*

Be it known that I, DANIEL F. CHURCHILL, a citizen of the United States, residing at Wakonda, in the county of Clay and State of South Dakota, have invented certain new and useful Improvements in Corn Harvesting and Husking Machines; and I do declare the following to be a full, clear, and exact description of the invention, such as will enable others skilled in the art to which it appertains to make and use the same.

My invention relates to improvements in corn harvesting and husking machines of that class which are designed to be drawn through a corn-field and which are adapted to snap the ears from the standing stalks and cut and remove the husks from the ears.

One object of the invention is to provide a machine of this character with simple and efficient mechanism for snapping the ears from the standing stalks.

Another object of the invention is to provide a simple and efficient mechanism for cutting and removing the husks from the ears of corn and separating the husks from the ears.

A further object of the invention is to improve and simplify the construction and operation of machines of this character, and thereby render the same more efficient and durable in use and less expensive to manufacture.

With the above and other objects in view the invention consists of certain novel features of construction, combination, and arrangement of parts, as will be hereinafter described and claimed.

In the accompanying drawings, Figure 1 is a side elevation, with parts broken away, of my improved corn harvesting and husking machine. Fig. 2 is a top plan view of the machine. Fig. 3 is a vertical longitudinal sectional view taken on the plane indicated by the line 3 3 in Fig. 2; and Figs. 4, 5, 6, 7, and 8 are detail vertical transverse sectional views taken, respectively, on the planes indicated by the lines 4 4, 5 5, 6 6, 7 7, and 8 8 in Fig. 1.

My improved corn harvesting and husking machine comprises a horizontally-disposed frame 1, mounted upon two supporting-wheels 2 3 and having at its forward end a vertically-disposed portion or frame 4. The construction of the latter is clearly shown in Fig. 4 of the drawings. Said frame is composed of a bar $a$, a bar $b$, and a bar $c$. The bar $a$ is bent to form a central U-shaped portion $d$ and arches $e$. The bar $b$ bears on the tops of said arches and extends over the U-shaped portion $d$. The bar $c$ is bent in U form, has its central portion secured on the bar $b$ at a point over one of the arches, and its upturned arms are provided with bearings for a crank-shaft 18, hereinafter described. Projecting forwardly from said frame portion 4 upon one side are a pair of gathering-arms 5, while from its opposite side is supported the forwardly-projecting draft tongue or pole 6. This tongue is mounted in supporting-brackets 7 and carries a seat 8 for the operator, whose weight together with the weight of the gathering-arms 5 and their attachments balance the horizontal frame 1, upon which latter is mounted the corn-husking mechanism, hereinafter described. The supporting-wheel 2 is mounted to turn upon a stub-shaft provided upon one of the outer depending arms 9 of the frame 4, and the other wheel 3, which also serves as a drive-wheel, is secured upon a short shaft 10, mounted in suitable bearings in the arm 9 upon the other side of the machine. Upon the inner end of the shaft 10 is a gear-wheel 11, which meshes with a pinion 12, secured upon a main drive-shaft 13, which extends transversely of the machine and is mounted in suitable bearings in the upper portion of the frame 4 beneath its top or cross bar.

The gathering-arms 5 are mounted upon the frame 4 in an upwardly and rearwardly inclined position, and they are spaced apart and have their forward lower ends curved or flared outwardly to direct the stalks of corn between them. In their upper faces are formed longitudinally-extending troughs 14, through which are adapted to travel endless conveyers 15 in the form of sprocket-chains, provided with projecting fingers. These chains 15 pass over idle sprocket-wheels 16 at the lower ends of the arms 5 and over driving sprocket-wheels 17, secured upon a transversely-extending shaft 18, mounted in suitable bearings upon the top cross-bar of the frame 4. This shaft 18 is driven from the main shaft 13 by a sprocket-chain 19, passed around sprocket-wheels secured upon said shafts, as clearly shown in Fig. 4. The sprocket-chains or conveyers 15 are so constructed and mounted that the ears of corn falling upon them will be carried upwardly and rearwardly and discharged off of the upper ends of the arms 5 into a transversely-extending and downwardly-inclined trough or chute 20. The ears of corn are adapted to be snapped from the stalks passing between the arms 5 by means of a pair of snapping bars or levers 21, which have beveled upper edges and which are adapted to be oscillated vertically. These snapping bars or levers are pivotally mounted at their lower ends, as shown at 22, upon cushioned bars 23, which extend longitudinally along the upper inner edges of the arms 5 and are adapted to slide transversely thereon, as clearly shown in Fig. 6 of the drawings. These bars 23 are provided with transversely-extending guide-rods 24, which extend through openings in brackets 24$^a$, secured upon the outer faces of the arms 5 and are surrounded by springs 25, which project them toward each other and over the space between the arms 5. Nuts 24' upon the outer screw-threaded ends of the rods 24 limit the inner sliding movement of the bars 23 and permit adjustment of the latter to vary the space between them and the snapping-levers 21. The latter are mounted in suitable guides 26 upon the bars 23, and they are oscillated vertically by the engagement of their upper free ends 27 with a pair of oppositely-disposed cranks 28, provided upon the central portion of the shaft 18, as clearly shown in Fig. 4.

It will be seen that when the shaft 18 is rotated the cranks 28 will cause the snapping-levers 21 to be alternately raised and lowered, so that they will effectively snap the ears of corn from the stalks. It will also be observed that since said levers are mounted upon the transversely-sliding cushioned bars 23 large or thick bunches of stalks entering between the arms 5 will be flattened or thinned, so that the oscillatory snapping-levers will more effectively snap the ears from the stalks.

In order to prevent the stalks from being pulled out of the ground and to cause them to more readily pass rearwardly between the arms 5 and under the vertical or arch frame 4 and the transverse shaft 13, I provide beneath the outer arm 5 an upwardly and rearwardly-inclined endless conveyer 29 and beneath the rear portion of the inner arm 5 a horizontally-disposed endless conveyer 30. The feeding-conveyer 29 is preferably in the form of a sprocket-chain carrying projecting fingers and passing around sprocket-wheels 31 32, journaled in suitable brackets upon the outer arm 5. The upper sprocket-wheel 32 is secured upon an inclined shaft 33, which carries a bevel-gear 34, adapted to mesh with a bevel-gear 35 upon the main drive-shaft 13, so that the motion of the latter will be imparted to the feeding-conveyer 29. The feeding-conveyer 30 is also in the form of a sprocket-chain having projecting fingers and adapted to pass around front and rear sprocket-wheels 36 37, the former of which is mounted upon a bracket 36$^a$, projecting forwardly from the frame 4, and the latter of which is secured upon a vertical shaft 38, mounted in a bracket 39, projecting from one of a pair of uprights 40 upon the horizontal frame 1, as clearly shown in Fig. 7.

The ears of corn as they fall into the trough or chute 20 fall upon a rapidly-moving endless conveyer 41, here shown in the form of a sprocket-chain passing over sprocket-wheels 42 43, disposed in the opposite ends of the trough or chute 20, so that the upper stretch of said belt or conveyer will travel in the bottom of said chute. This rapidly-moving belt or conveyer 41 is driven by providing upon the shaft 44 of its upper sprocket-wheel 42 a bevel-gear 45, which meshes with a bevel-gear 46 upon a vertical shaft 47, journaled in a bearing-bracket projecting from one of the arms or uprights 9. This shaft 47 has secured upon its lower end a bevel-gear 48, which meshes with a bevel-gear 49 upon one end of the main drive-shaft 13. The rapidly-moving belt or conveyer 41 discharges the ears of corn with considerable force out of its lower end, so that they are thrown upon the far side of a rearwardly-inclined chute or hopper 50, which feeds them to the husking mechanism upon the horizontal frame 1 of the machine. When the ears of corn are thus discharged into the feeding trough or hopper 50, they strike a slowly-moving upwardly and forwardly inclined belt or conveyer 52, here shown in the form of a broad sprocket-chain which passes over sprocket-wheels 53 54, provided in slots or openings in the vertical wall 55 of the chute or hopper 50. The belt or conveyer 52 is thus mounted so that its inner stretch travels within the chute or hopper 50 and adjacent to its downwardly and rearwardly inclined bottom 56 in order that all wedging and clogging of the ears of corn in said hopper will be prevented.

It will be seen that as the ears of corn strike the inner stretch of this belt or conveyer 52 they will be turned so that they extend transversely and in a position to be readily picked up by the husking mechanism, presently described. The sprocket-wheel 54 is secured upon a downwardly and forwardly inclined shaft 57, mounted in suitable bearings and carrying a bevel-gear 58, which meshes with a similar bevel-gear 59, secured upon the main drive-shaft 13, so that the belt or conveyer 52 is thus driven from said shaft 13.

The mechanism for husking the ears of corn comprises a broad endless apron or carrier 60, composed of an endless flexible band or belt 61 and parallel transverse slats 62, secured upon its outer face. Upon some of the slats 62 are provided curved or hook-shaped arms 63, which are adapted to travel through the slotted rear edge of the bottom 56 of the hopper 50 and pick up the ears therein. The ears of corn thus taken up by said arms are conducted rearwardly by the same and first passed over cutting-knives 64, which cut the husks, and then under hooks or similar devices 65, which remove the husks from the ears. The knives 64 are in the form of longitudinally-extending blades, which have portions of their upper edges serrated similar to a saw and which are reciprocated in longitudinal grooves 62$^a$, formed in the slats 62, by having their forward ends downwardly bent and connected by links 66 to cranks 67, formed upon a transverse shaft 68. The cranks 67 are oppositely disposed, so that the blades will be reciprocated alternately, and the shaft 68 is driven from the main shaft 13 by a sprocket-chain 69, passed around sprocket-wheels secured upon said shafts, as clearly shown in Fig. 2 of the drawings. Upon the opposite end of the shaft 68 is a bevel-gear 70, which meshes with a similar gear 71 upon the shaft 38, so that the latter shaft receives its motion from the shaft 68, as will be seen upon reference to Fig. 7 of the drawings.

In order to hold the ears down upon the knives, rearwardly-curved depending springs 72 are provided upon the transverse slats of a horizontally-disposed frame 73, which is suspended by means of coiled springs or the like 74 from the upper portion of the horizontal frame 1 and above the upper stretch of the carrier or conveyer 60. The hooks 65, which remove the husks from the ears of corn, project downwardly and forwardly from slats or crossed bars 75, which are hinged at 76 upon the transverse slats of the frame 73. These bars 75 are hinged to permit them to be swung upwardly for the purpose of removing the husks from their hooks 65, and this upward swinging movement is automatically effected by providing upwardly-extending arms 77 upon the bars 75 and pivotally connecting said arms to a longitudinal bar or rod 77'. The latter has its rear end connected to a coiled spring 78, which pulls it rearwardly and holds the bars 75 and their hooks 65 in their normal lowered position, and the forward end of the bar 77 is pivotally connected to the rear end of an operating-rod 79. The latter projects through a guide-opening in the inclined bottom of the hopper 50 and has its forward end upwardly bent and projecting into the path of tappet-arms 80 upon the main shaft 13, as clearly shown in Fig. 3 of the drawings. It will be seen that as the shaft 13 is rotated the hooks 65 will be raised and lowered.

In order to render the cutting and removing of the husks more effective, I rotate the ears in the curved hook-arms 63 by means of endless belts 81, which have rough upper or outer faces and which travel through longitudinal grooves formed in the upper or outer faces of the slats 62, as clearly shown in Figs. 3 and 5 of the drawings. These belts 81 are preferably in the form of sprocket-chains, which have their lower stretches engaged with driving sprocket-wheels 82 upon a shaft 83, disposed transversely beneath the lower stretch of the carrier or apron 60. This shaft 83 is driven, as shown in Figs. 1 and 2, by a sprocket-chain 84, passed over sprocket-wheels upon said shaft and upon the shaft 85, which carries the forward roller of a pair of rollers 86, over which the endless carrier or apron 60 travels and by means of which it is driven. This drive-shaft 85 is driven from the main drive-shaft 13 by a sprocket-chain 87, passed over sprocket-wheels upon said shafts, as clearly shown in Figs. 2 and 3 of the drawings.

As the ears of corn and their husks are discharged off of the rear end of the carrier or apron 60 they pass through an air-blast, which blows the husks outwardly or rearwardly and permits the ears of corn to drop into a trough or chute 88. This air-blast is produced by a rotary fan or blower 89, located in a casing 90 upon the horizontal frame 1 beneath the husking mechanism. This fan is driven by a sprocket-chain 91, passed over sprocket-wheels upon its shaft 92 and the shaft 85, as shown in Fig. 2. The ears of corn discharged into the transversely-extending chute or trough 88 are fed by the latter, which is inclined to one side and which is reciprocated transversely onto an endless conveyer or carrier 93, which conducts them upwardly and to one side and discharges them into a wagon traveling alongside of the machine. This conveyer or carrier 93 is in the form of a sprocket-chain passed around sprocket-wheels and having its upper stretch traveling in the bottom of a substantially V-shaped upwardly and outwardly inclined trough 94, which is suspended by means of a crane or bracket 95, as clearly shown in Figs. 2 and 8 of the drawings. The shaft 195 of the lower sprocket-wheel of the chain 93 supports the lower end of the trough 94 and has secured upon it a beveled pinion 96, which meshes with a beveled pinion 197 upon a vertical shaft 97, mounted in suitable bearings, as shown in Fig. 1. The upper end of this shaft 97 is connected by a pair of bevel-gears 98 to the shaft of the rear roller 86 of the carrier or apron 60. The chute or trough 88 is mounted to slide upon the rear end of the horizontal frame 1 by providing upon the upper portion of its forward side a slotted flange 99, which is slotted, as shown at 100, to receive headed guide pins or studs 101, provided upon a transverse block or bearing upon the rear end of the frame. This construction permits the trough 88 to slide transversely, and it is moved by providing a crank-disk 102 upon the rear end of the shaft 195 and connecting the pin of said crank to a pitman 103, which has its opposite end connected to a projecting stud or arm upon the bottom of the trough 88, as clearly shown in Figs. 1 and 2.

The construction, operation, and advantages of the invention will be readily understood from the foregoing description, taken in connection with the accompanying drawings and the following brief statement: A team of horses or other draft-animals is hitched to the tongue or pole of the machine, so that as the machine is drawn forward one row will pass between the gathering-arms 5. As the machine moves forwardly the ears are snapped from the stalks by the oscillating levers 21 and fall upon the conveyers 15, which carry them upwardly and rearwardly and drop them into the trough 20. The rapidly-moving belt 41 in the latter discharges them into the hopper 50 and against the slowly and upwardly moving belt 52, which prevents them from wedging, as previously explained. They are picked from the hopper 50 by the curved arms upon the slats of the apron or carrier 60 and moved rearwardly, so that the cutting-knives 64 cut the husks and the hooks 65 remove the husks. As the ears of corn drop from the rear end of the apron or carrier 60 they fall into the trough 88, which feeds them to the conveyer 93, and the latter discharges them into a wagon or the like running alongside of the machine.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. In a corn-harvester, the combination of a frame, inclined gathering-arms projecting therefrom and having longitudinal troughs in their upper sides, conveyers operating in the bottoms of said troughs, vertically-movable snapping-bars on the inner sides of said gathering-arms and pivotally mounted at their lower ends, and means to raise and lower the upper ends of said gathering-arms and simultaneously move them in opposite directions, substantially as described.

2. In a corn-harvester, a pair of snapping-bars mounted for vertical movement and also mounted for lateral movement toward and from each other, springs to normally move said snapping-bars toward each other, and means to simultaneously move said snapping-bars vertically in reverse directions, substantially as described.

3. In a corn-harvester, a pair of snapping-bars mounted for vertical angular movement and also mounted for lateral movement toward and from each other, and springs to normally move said snapping-bars toward each other, in combination with a revoluble shaft having cranks to impart vertical movement to said snapping-bars, substantially as described.

4. In a corn-harvester, a pair of snapping-bars mounted for vertical angular movement and also mounted for lateral movement toward and from each other, and springs to normally move said snapping-bars toward each other, in combination with a revoluble shaft having oppositely-extending cranks to simultaneously move said snapping-bars vertically in reverse directions, substantially as described.

5. A corn-harvester having a main frame provided with an archway to clear the standing cornstalks, downwardly and forwardly inclined gathering-arms projecting forwardly from opposite sides of said archway, means to snap the ears from the standing stalks, an inclined, endless conveyer under one of the gathering-arms at one side of the archway and having a rearwardly-running, inner lead, and a horizontally-disposed, endless conveyer below the other gathering-arm, extending longitudinally across the opposite side of the archway and having a rearwardly-running, inner lead, substantially as described.

6. A machine of the class described having a transversely-disposed downwardly-inclined trough, means to snap ears from standing cornstalks, means to deliver such snapped ears to said trough, a conveyer in the bottom of said trough to forcibly discharge the ears therefrom, a hopper having a downwardly and rearwardly inclined bottom, onto which the ears are discharged from said trough, one side of the said bottom being under the discharge end of said trough, means on the bottom, at the opposite side thereof to arrest the ears and dispose them longitudinally of the bottom for discharge therefrom in such position, and a husking mechanism fed from said hopper, substantially as described.

7. In a machine of the character described the combination of a pair of gathering-arms, troughs provided upon said arms, elevators in said troughs, yieldable supports upon said arms, and oscillatory snapping levers or bars pivotally mounted upon said supports and arranged adjacent to the inner edges of said arms.

8. In a machine of the character described, gathering-arms, yieldable supports thereon, and oscillating snapping bars or levers upon said supports.

9. In a machine of the character described, gathering-arms having troughs thereon, elevating devices in said troughs, laterally-yieldable supports upon said arms, and vertically-oscillating snapping bars or levers upon said supports.

In testimony whereof I have hereunto set my hand in presence of two subscribing witnesses.

DANIEL F. CHURCHILL.

Witnesses:
SAM. JACOBSON,
FRANK MORRISON.